United States Patent
Frenne et al.

(10) Patent No.: US 11,528,115 B2
(45) Date of Patent: Dec. 13, 2022

(54) METHODS AND APPARATUSES FOR CONFIGURATION OF MEASUREMENT RESTRICTIONS

(71) Applicant: Telefonaktiebolaget LM Ericsson (publ), Stockholm (SE)

(72) Inventors: Mattias Frenne, Uppsala (SE); Shiwei Gao, Nepean (CA); Robert Mark Harrison, Grapevine, TX (US); Siva Muruganathan, Stittsville (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/969,865

(22) Filed: May 3, 2018

(65) Prior Publication Data
US 2018/0359073 A1 Dec. 13, 2018

Related U.S. Application Data

(63) Continuation of application No. PCT/SE2016/051081, filed on Nov. 3, 2016.
(Continued)

(51) Int. Cl.
*H04W 24/10* (2009.01)
*H04L 5/00* (2006.01)
(Continued)

(52) U.S. Cl.
CPC .......... *H04L 5/0057* (2013.01); *H04L 5/0048* (2013.01); *H04L 5/0085* (2013.01);
(Continued)

(58) Field of Classification Search
CPC .. H04W 24/10; H04W 72/042; H04L 5/0057; H04L 5/0048; H04L 5/0085; H04L 5/0091; H04L 1/0026; H04L 5/001; H04L 5/0023
See application file for complete search history.

(56) References Cited

U.S. PATENT DOCUMENTS

2012/0157082 A1 6/2012 Pedersen et al.
2013/0294351 A1* 11/2013 Kwon .................. H04L 1/0028
370/328
(Continued)

FOREIGN PATENT DOCUMENTS

CN 102281556 A 12/2011
CN 102685794 A 9/2012
(Continued)

OTHER PUBLICATIONS

U.S. Appl. No. 62/207,946 (Year: 2015).*
(Continued)

*Primary Examiner* — John D Blanton
(74) *Attorney, Agent, or Firm* — Murphy, Bilak & Homiller, PLLC

(57) ABSTRACT

There is disclosed a method for operating a wireless device in a wireless network, wherein the wireless device is configured, by higher layer signaling, with a first measurement restriction (MR) configuration for measuring and reporting Channel State Information (CSI) the method comprises transmitting a first indication with lower layer signaling, indicating that a second MR configuration for measuring and reporting CSI, replaces the first MR configuration for measuring and reporting CSI.

28 Claims, 6 Drawing Sheets

Related U.S. Application Data

(60) Provisional application No. 62/250,607, filed on Nov. 4, 2015.

(51) Int. Cl.
   *H04W 72/04* (2009.01)
   *H04W 24/00* (2009.01)
   *H04L 1/00* (2006.01)

(52) U.S. Cl.
   CPC ......... *H04L 5/0091* (2013.01); *H04W 72/042* (2013.01); *H04L 1/0026* (2013.01); *H04L 5/001* (2013.01); *H04L 5/0023* (2013.01); *H04W 24/00* (2013.01)

(56) References Cited

U.S. PATENT DOCUMENTS

| | | | |
|---|---|---|---|
| 2014/0036854 A1 | 2/2014 | Tong et al. | |
| 2014/0126402 A1* | 5/2014 | Nam | H04B 7/0452 370/252 |
| 2014/0218020 A1 | 8/2014 | Zhou et al. | |
| 2016/0142189 A1* | 5/2016 | Shin | H04L 5/0051 370/329 |
| 2016/0242054 A1* | 8/2016 | Lee | H04W 24/08 |
| 2018/0248607 A1* | 8/2018 | Park | H04B 7/0632 |
| 2018/0278390 A1* | 9/2018 | Yakada | H04L 5/0048 |

FOREIGN PATENT DOCUMENTS

| | | |
|---|---|---|
| CN | 102823311 A | 12/2012 |
| CN | 103188750 A | 7/2013 |
| CN | 103581945 A | 2/2014 |
| CN | 104584450 A | 4/2015 |
| CN | 104718783 A | 6/2015 |
| CN | 104956722 A | 9/2015 |
| EP | 2846356 A2 | 3/2015 |
| JP | 2011517895 A | 6/2011 |
| RU | 2417531 C2 | 4/2011 |
| RU | 2524867 C2 | 8/2014 |
| WO | 2013166923 A1 | 11/2013 |
| WO | 2014019158 A1 | 2/2014 |
| WO | 2014109561 A1 | 7/2014 |
| WO | 2015032038 A1 | 3/2015 |
| WO | 2015060619 A1 | 4/2015 |

OTHER PUBLICATIONS

CATT ("CSI-RS measurement restriction for beamformed CSI-RS", Aug. 2015, R1-154752) (Year: 2015).*

3GPP, "3rd Generation Partnership Project; Technical Specification Group Radio Access Network; Evolved Universal Terrestrial Radio Access (E-UTRA); Multiplexing and channel coding (Release 12)", 3GPP TS 36.212 V12.3.0, Dec. 2014, 1-89.

3GPP, "3rd Generation Partnership Project; Technical Specification Group Radio Access Network; Evolved Universal Terrestrial Radio Access (E-UTRA); Physical channels and modulation (Release 12)", 3GPP TS 36.211 V12.3.0, Sep. 2014, 1-124.

3GPP, "3rd Generation Partnership Project; Technical Specification Group Radio Access Network; Evolved Universal Terrestrial Radio Access (E-UTRA); Physical layer procedures (Release 12)", 3GPP TS 36.213 V12.3.0, Sep. 2014, 1-212.

3GPP, "3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 V12.3.0, Sep. 2014, 1-384.

Unknown, Author, "Final details of measurement restriction", 3GPP TSG-RAN WG1#83, R1-157202, Anaheim, US, Nov. 16-20, 2015, 1-4.

Unknown, Author, "CSI measurement restrictions", Ericsson, 3GPP TSG-RAN WG1#82bis, R1-155674, Malmö, Sweden, Oct. 5-9, 2015, 1-3.

Unknown, Author, "WF on CSI Measurement Restriction", Samsung et al., 3GPP TSG-RAN WG1#82, R1-154958, Beijing, China, Aug. 24-28, 2018, 1-5.

Unknown, Author, "Beamformed CSI-RS related enhancements based on the identified approaches", LG Electronics, 3GPP TSG RAN WG1 Meeting #82, R1-154274, Beijing, China, Aug. 24-28, 2015, 1-7.

Unknown, Author, "Research on Multicast Optimization Mechanism and Algorithm for Multi-Radio Frequency and Multi-channel Wireless Mesh Networks", Wuhan University of Technology, Nov. 30, 2011, 1-121.

Unknown, Author, "Status Report RAN WG4 to TSG-RAN #55", 3GPP TSG RAN #55 RP-120027 Xiamen, China, Feb. 28-Mar. 2, 2012, 1-61.

Wang, Junfang, et al., "Heterogeneous Interface Configuration in Wireless Mesh Networks", IEEE Communications Society, 2008, 1-6.

Unknown, Author, "Discussion on CSI-RS measurement restriction", 3GPP TSG RAN WG1 Meeting #82bis R1-155956, Malmo, Sweden, Oct. 5-9, 2015, 1-3.

Unknown, Author, "WF on CSI process for PMI based Rel. 13 FD-MIMO", 3GPP TSG-RAN WG1#82 R1-154781, Beijing, China, Aug. 24-28, 2015, 1-2.

* cited by examiner

METHODS AND APPARATUSES FOR CONFIGURATION OF MEASUREMENT RESTRICTIONS

RELATED APPLICATIONS

The present application is a continuation of international patent application serial no. PCT/SE2016/051081, filed 3 Nov. 2016, which claims priority to U.S. provisional application Ser. No. 62/250,607, filed 4 Nov. 2015. The entire contents of each of the foregoing applications is incorporated herein by reference.

TECHNICAL FIELD

Embodiments herein relate to telecommunications and or data communications in general and in particular to methods and apparatuses for configuring CSI measurement restrictions in wireless communication.

BACKGROUND

The 3rd Generation Partnership Project (3GPP) is responsible for the standardization of the Universal Mobile Telecommunication System (UMTS) and Long-Term Evolution (LTE). The 3GPP work on LTE is also referred to as Evolved Universal Terrestrial Access Network (E-UTRAN). LTE is a technology for realizing high-speed packet-based communication that can reach high data rates both in the downlink and in the uplink and is thought of as the fourth-generation mobile communication system. In order to support high data rates, LTE allows for a system bandwidth of 20 MHz, or up to 100 MHz when carrier aggregation is employed. LTE is also able to operate in different frequency bands and can operate in at least Frequency Division Duplex (FDD) and Time Division Duplex (TDD) modes. To further improve on the data rates offered by LTE, 3GPP is currently defining the New Radio access technology (NR) which is considered to be the fifth-generation mobile communication system. NR supports a wide range of carrier frequency include both below 6 GHz and above 6 GHz.

In LTE Rel-8, cell-specific reference signals (CRS) is used in DL for CSI estimation and feedback, and for channel estimation for demodulation. CRS are transmitted in every subframe and are defined to support up to 4 antenna ports (APs). In LTE Rel-10, in order to support up to 8 APs, CSI reference signals (CSI-RS) is defined for a UE to measure and/or report CSI feedback using the multiple APs. In LTE, a UE may be configured to report channel state information (CSI) based on measurements on certain resources; these are so called CSI-RS resources. The CSI-RS resources may be associated with non-zero power (NZP) CSI-RS resources and/or zero power (ZP) CSI-RS resources. For the NZP CSI-RS resources the UE may expect non-zero power transmissions from the serving cell whereas for the ZP CSI-RS resources (which are also called CSI interference measurement (CSI-IM) resources) the UE may expect zero power transmissions.

In current LTE, the NZP CSI-RS resources and CSI-IM resources (also known as ZP CSI-RS resources) are configured by higher layer signaling, e.g. RRC signaling. Additionally, in LTE it is possible to configure measurement restriction (MR) for CSI measurements. Measurement restriction (MR) means that the time over which the UE is allowed to perform CSI measurements is restricted, e.g. to a single subframe.

The MR may be configured per CSI process and per cell. In total, a UE may consequently be independently configured with MR for at least:

Multiple cells and/or component carriers (currently between 5 and 32)
Multiple CSI processes per cell (up to 4)
Two subframe sets per CSI process
For each subframe set, for NZP- and ZP CSI-RS Additionally, one can anticipate a possibility to configure CSI feedback with independent MR for each of the CSI-RS resources in a CSI process. Currently up to 8 CSI-RS resources may be supported in a CSI-process, each such resource may support up to 8 CSI-RS antenna ports (AP). Therefore, a huge amount of independent MR configurations for a UE is anticipated. E.g., if only considering the possible combinations of cells, one can see that the possible number of combinations equals:

$$\sum_{k=0}^{32} \binom{32}{k} = 4294967296 \qquad (\text{eq. 1})$$

The number of cell and/or component carrier combinations can be represented by 32 bits. Including all the above-mentioned combinations, more bits have to be added to the already required 32 bits to uniquely identify all possible cell combinations.

The configuration of MR is done by RRC signaling. However, RRC configuration (or re-configuration) may imply a delay. If the network cannot quickly respond to environment changes, by rapidly changing the MR configuration, the network performance will deteriorate.

Using a lower layer signaling message, with low delay, for this purpose is not suitable due to the huge amount of different MR configurations (see e.g. eq. 1 above), which would occupy too many control bits in a lower layer signaling message with a limited number of control bits, usually fewer than 100.

SUMMARY

It is an object of embodiments described herein to address at least some of the problems and issues outlined above. It is possible to achieve this object and others by using methods and apparatuses, such as radio network nodes and wireless devices, as defined in the attached independent claims.

According to one aspect, there is provided a method, in a radio network node 80, for operating a wireless device in a wireless network, wherein the wireless device is configured, by higher layer signaling, with a first measurement restriction (MR) configuration for measuring and/or reporting Channel State Information (CSI). The method comprises transmitting a first indication with lower layer signaling, indicating that a second MR configuration for measuring and/or reporting CSI replaces the first MR configuration for measuring and/or reporting CSI.

According to another aspect, there is provided a radio network node, for operating a wireless device in a wireless network, the radio network node comprising a processing circuitry and a memory, said memory containing instructions executable by said processing circuitry, whereby said radio network node is configured to transmit a first indication with lower layer signaling, indicating that a second MR configuration for measuring and/or reporting CSI replaces the first MR configuration for measuring and/or reporting CSI.

According to a third aspect, there is provided a method for reporting Channel State Information (CSI) in a wireless device, the wireless device is configured, by higher layer signaling, to measure and/or report CSI according to a first measurement restriction (MR) configuration, the method comprising receiving by lower layer signaling, from a radio network node, a first indication indicating that a second MR configuration for measuring and/or reporting CSI replaces the first MR configuration for measuring and/or reporting CSI.

According to a fourth aspect, there is provided a wireless device for reporting Channel State Information (CSI), wherein the wireless device is configured, by higher layer signaling, with a first measurement restriction (MR) configuration for measuring and/or reporting CSI, the wireless device comprising a processing circuitry and a memory, said memory containing instructions executable by said processing circuitry, whereby said wireless device is configured to receive by lower layer signaling, from a radio network node, a first indication indicating that a second MR configuration for measuring and/or reporting CSI replaces the first MR configuration for measuring and/or reporting CSI.

The above wireless device and radio network node and methods therein may be implemented and configured according to different optional embodiments to accomplish further features and benefits, to be described below.

Some of the advantages achieved by some embodiments of the methods and the corresponding radio network node and wireless devices may be compiled as:

enabling efficient dynamic configuration of measurement restrictions for measuring and/or reporting CSI enabling an improved link adaptation for wireless devices optimizing a trade-off between measurement restrictions and link adaptation for individual wireless devices reducing the signaling overhead of dynamic configuration of MR for measuring and/or reporting CSI.

dynamic configuration of MR for measuring and/or reporting CSI has the benefit of disabling the MR, to allow the UE to use measurement averaging across several CSI-RS resources, temporarily.

BRIEF DESCRIPTION OF DRAWINGS

The solution will now be described in more detail by means of exemplary embodiments and with reference to the accompanying drawings, in which.

DETAILED DESCRIPTION

Figure 1:
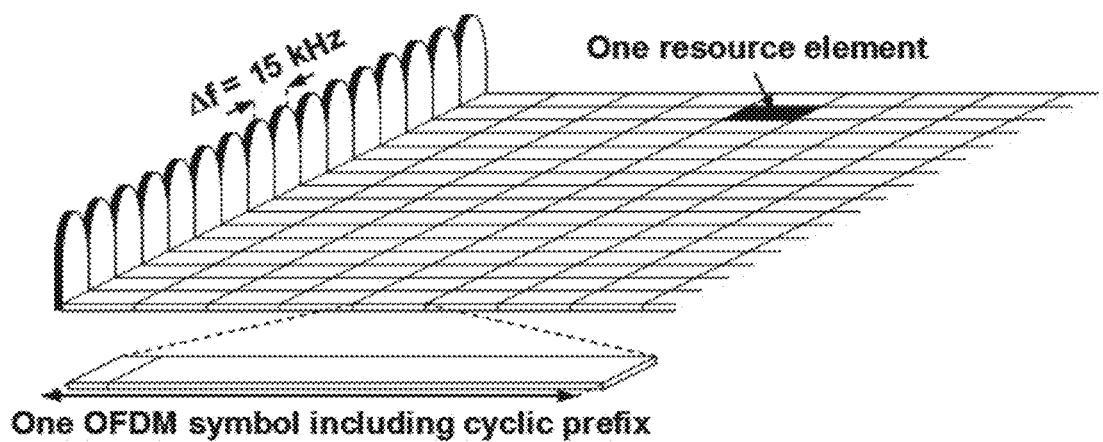
FIG. 1 illustrates an example of an LTE downlink physical resource.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness. Accordingly, it should be apparent to those skilled in the art that the following description of exemplary embodiments of the present invention are provided for illustration purpose only and not for the purpose of limiting the invention as defined by the appended claims and their equivalents. It is to be understood that the singular forms "a," "an," and "the" include plural referents unless the context clearly dictates otherwise. Thus, for example, reference to "a component surface" includes reference to one or more of such surfaces.

It is an object of the present disclosure to provide embodiments for configuring measurement restrictions in a wireless network and thereby enabling efficient dynamic configuration of measurement restrictions in order to enable an improved link adaptation for individual wireless devices. As mentioned above, solutions for providing a low latency configuration of measurement restrictions have been lacking due to the large amount of data associated with the configuration.

As used herein, the non-limiting terms "wireless device" and "User Equipment, UE" may refer to a mobile phone, a cellular phone, a Personal Digital Assistant, PDA, equipped with radio communication capabilities, a smart phone, a laptop or Personal Computer, PC, equipped with an internal or external mobile broadband modem, a tablet PC with radio communication capabilities, a target device, a device to device UE, a machine type UE or UE capable of machine to machine communication, iPAD, customer premises equipment, CPE, laptop embedded equipment, LEE, laptop mounted equipment, LME, USB dongle, a portable electronic radio communication device, a sensor device equipped with radio communication capabilities or the like. In particular, the term "wireless device" should be interpreted as non-limiting terms comprising any type of wireless device communicating with a radio network node in a cellular or mobile communication system or any device equipped with radio circuitry for wireless communication according to any relevant standard for communication within a cellular or mobile communication system. It shall be mentioned that a wireless device 90 may be an implementation of a UE.

As used herein, the non-limiting term "radio network node" may refer to base stations, network control nodes such as network controllers, radio network controllers, base station controllers, and the like. In particular, the term "base station" may encompass different types of radio base stations including standardized base stations such as Node Bs, or evolved Node Bs, eNodeBs (eNB), for LTE, or gNode Bs for NR. It shall be mentioned that a radio network node 80 may be an implementation of an eNB according to the description.

In the present disclosure, the non-limiting term "wireless network" may refer to any radio communication networks, in particular UTRA for WCDMA or eUTRA for LTE or gUTRA for NR, but any other wireless communications system such as NR and/or WiFi and/or WiMax can be anticipated.

Figure 7:
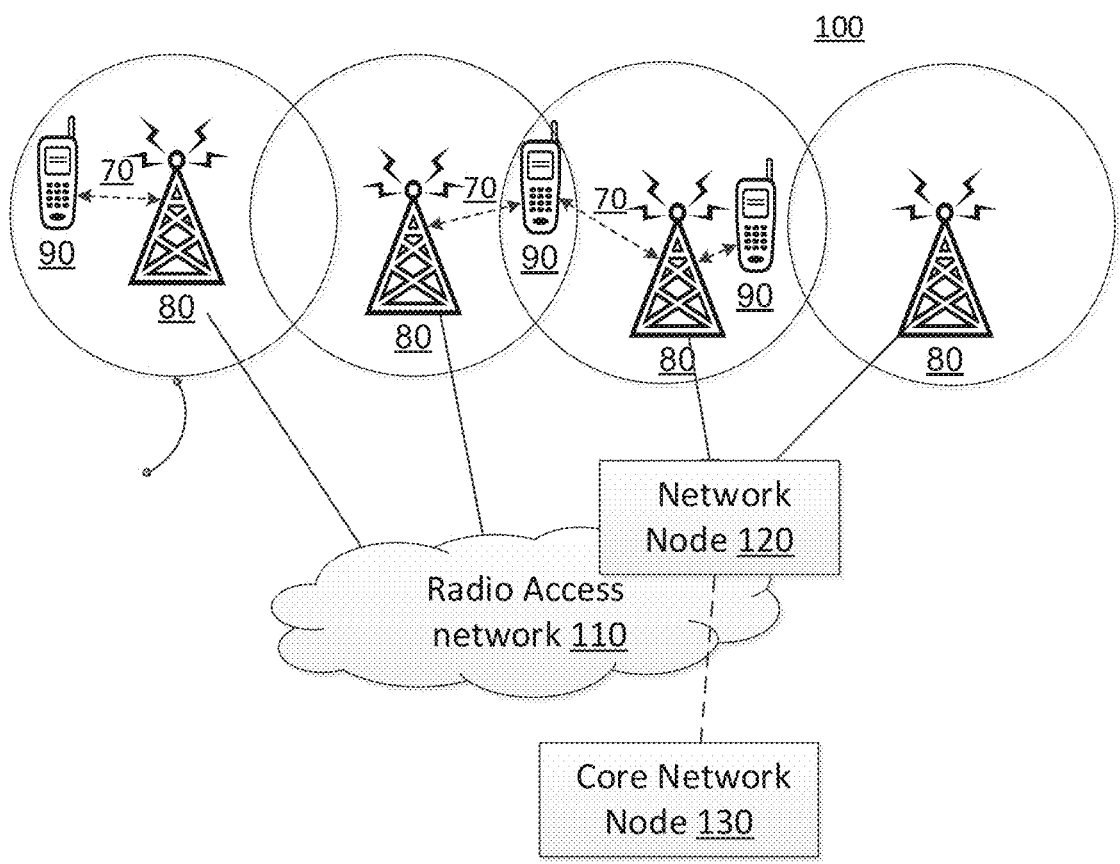
FIG. 7 illustrates an exemplary wireless network 100 in which embodiments herein may be applied and/or implemented.

FIG. 7 illustrates a wireless network 100 in which embodiments, disclosed herein, may be carried out. The wireless network 100 includes one or more wireless devices 90, radio network nodes 80, network nodes 120. The wireless network may be connected to core network nodes 130. A wireless device 90 may communicate with a radio network node 80 over a wireless interface. For example, wireless devices 90 may transmit wireless signals to radio network nodes 80 and/or receive wireless signals from radio network nodes 80. The wireless signals may contain voice traffic, data traffic, control signals, and/or any other suitable information. The wireless signals may be transmitted over a radio link 70.

Radio network nodes 80 may interface with network nodes 120, such as e.g. a radio network controller 120 in a radio access network 110. A radio network controller 120 may control radio network nodes 80 and may provide certain radio resource management functions, mobility management functions, and/or other suitable functions. Radio network controller 120 may interface with core network node 130. In certain scenarios, radio network controller 120 may interface with core network node 130 via an interconnecting network. Radio network nodes 80 may also interface with core network node 130. In certain scenarios, radio network node 80 may interface with core network node 130 via an interconnecting network.

In some scenarios, core network node 130 may manage the establishment of communication sessions and various other functionalities for wireless devices 90. Wireless devices 90 may exchange certain signals with core network node 130 using the non-access stratum (NAS) layer. In non-access stratum signaling, signals between wireless device 90 and core network node 130 may be transparently passed through the radio access network. As described with respect to FIG. 7 above, embodiments of network 100 may include one or more wireless devices 90, and one or more different types of network nodes capable of communicating (directly or indirectly) with wireless devices 90. Examples of the network nodes include radio network nodes 80. The network may also include any additional elements suitable to support communication between wireless devices 90 or between a wireless device 90 and another communication device (such as a landline telephone).

Wireless devices 90 and radio network nodes 80 may use any suitable radio access technology, such as long term evolution (LTE), LTE-Advanced, NR, UMTS, HSPA, Global System for Mobile Communication (GSM), cdma2000, WiMax, WiFi, another suitable radio access technology, or any suitable combination of one or more radio access technologies. For purposes of example, various embodiments may be described within the context of certain radio access technologies, such as LTE. However, the scope of the disclosure is not limited to the examples and other embodiments could use different radio access technologies. Each of wireless devices 90, radio network nodes 80, radio network controller 120, and core network node 130 may include any suitable combination of hardware and/or software. Examples of particular embodiments of wireless devices 90 and radio network nodes 80 are described with respect to FIGS. 5, 6 and 8-11 below.

In what follows, particular embodiments will be described where measurement restrictions are configured for Channel State Information (CSI) measurements and CSI reporting. We therefore provide a short overview of what CSI measurements may refer to and in particular, how CSI measurements with measurement restrictions may be carried out and configured. More detailed information will be provided at relevant places.

LTE uses OFDM in the downlink and DFT-spread OFDM in the uplink. The basic LTE downlink physical resource can thus be seen as a time-frequency grid as illustrated in FIG. 1, where each resource element (RE) correspond to one OFDM subcarrier during one OFDM symbol interval.

Figure 2:
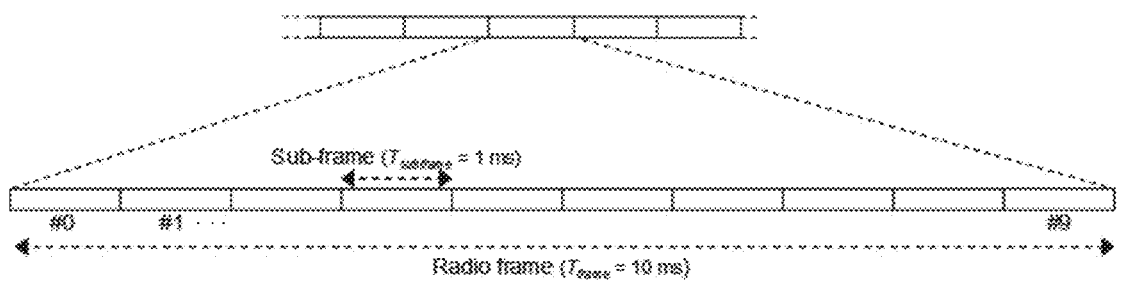
FIG. 2 illustrates an example of an LTE time-domain (frame) structure.

In the time domain, LTE downlink transmissions are organized into radio frames of 10 ms, each radio frame consisting of ten equally-sized subframes of length Tsubframe=1 ms, as illustrated in FIG. 2. A subframe may be divided in two equal parts, wherein each equal part is called a slot. For normal cyclic prefix, one subframe consists of 14 OFDM symbols. The duration of each OFDM symbol is approximately 71.4 µs.

Furthermore, the resource allocation in LTE is typically described in terms of resource blocks, RB, where a resource block corresponds to one slot (0.5 ms) in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

Downlink transmissions are dynamically scheduled, i.e., in each subframe the base station transmits control information about to which terminals data is transmitted and within which resource blocks the data is transmitted, in the current downlink subframe. This control signaling (PDCCH) is typically transmitted in the first 1, 2, 3 or 4 OFDM symbols in each subframe and the number n=1, 2, 3 or 4 is known as the Control Format Indicator (CFI). The downlink subframe also contains common reference symbols, which are known to the receiver and used for coherent demodulation of e.g. the control information. A downlink system with CFI=3 OFDM symbols as control is illustrated in FIG. 3.

The above described resource assignments may be scheduled on an Enhanced Physical Downlink Control Channel (EPDCCH) and/or on a Physical Downlink Control Channel (PDCCH).

Figure 3:
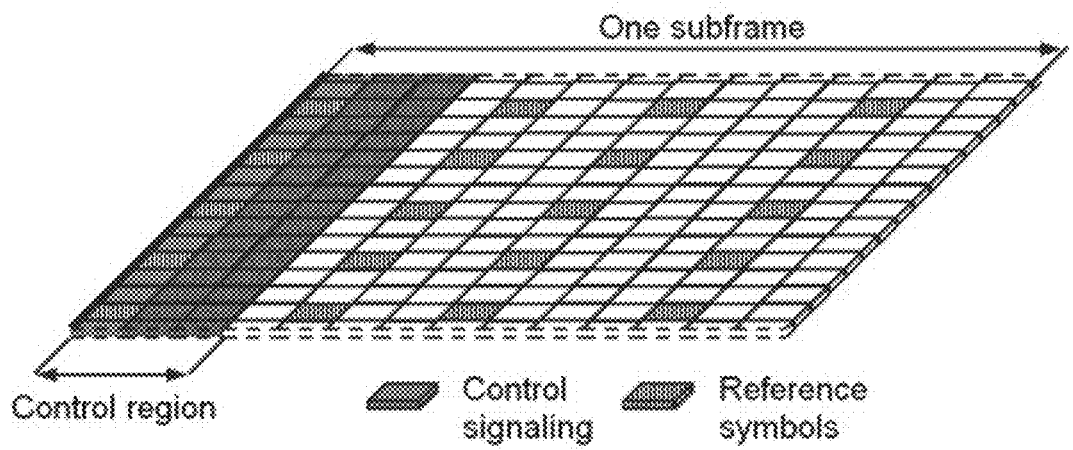
FIG. 3 illustrates an LTE downlink subframe with three OFDM symbols for lower layer control signaling, in particular downlink control information (DCI) messages

The reference symbols shown in the above FIG. 3 are the cell specific reference symbols (CRS), which may be used to support multiple functions, including e.g. fine time and frequency synchronization and channel estimation for certain transmission modes. A UE may be configured with a transmission mode to help the UE to determine how to process data transmissions received on the Physical Downlink Shared Channel (PDSCH). A UE may be informed of which transmission mode to use, via, for example, RRC signaling. In the DL there are several different transmission modes, wherein the transmission modes may differ in, for example, number of layers (streams, or rank) and/or antenna ports used and/or type of reference signal, such as Cell-specific Reference Signal (CRS) or Demodulation Reference Signal (DM-RS) or CSI-RS and precoding type.

In a cellular communication system there is a need to measure the channel conditions, in particular the radio channel conditions, in order to know what transmission parameters to use. These transmission parameters may include, for example, modulation type, coding rate, transmission rank, and frequency allocation. This applies to uplink (UL) as well as to downlink (DL) transmissions.

The scheduler, which makes the decisions on the transmission parameters, is typically located in the base station (eNB). Hence, a scheduler may get information on channel properties of the UL directly, using known reference signals that the terminals (UEs) transmit. These measurements then form a basis for the UL scheduling decisions that the eNB makes, the UL scheduling decisions are then sent to the UEs via a downlink control channel, e.g. via a PDCCH and/or via an ePDCCH.

CSI Feedback

In some releases of LTE, cell-specific reference signals (CRS) may be used in DL for CSI estimation and feedback, and for channel estimation for demodulation. CRS are transmitted in every subframe and are defined to support up to 4 antenna ports (APs). In other releases of LTE, in order to support up to 8 APs, there are CSI reference signals (CSI-RS) defined for a UE to measure and feedback CSI using the multiple APs. Each CSI-RS resource consists of 2 resource elements (RE) over 2 consecutive OFDM symbols. In particular, in LTE, the basic two-port CSI-RS resource consists of 2 resource elements (RE) over 2 consecutive OFDM symbols. Two different CSI-RS (for 2 different APs) can share the same CSI-RS resource (2 REs) by code division multiplexing (CDM). Also, a CSI-RS can be transmitted once per 5, 10, 20, 40 or 80 ms, which determines the CSI-RS periodicity. Therefore, a CSI-RS has lower overhead and lower duty-cycle when compared with CRS. On the other hand, a CSI-RS is not used as a demodulation reference while CRS is. Different CSI-RS may be transmitted with different offsets in subframe. This offset is called CSI-RS subframe offset. When a CSI-RS resource is configured, the UE measures the channel for a given antenna port at each configured CSI-RS resource and may interpolate the channel in between the occasions of CSI-RS resources, to get the dynamically varying channel. E.g. the UE may interpolate measure and/or estimate and/or calculate the channel per 1 ms instead of a configured CSI-RS periodicity of e.g. 5 ms.

Figure 4:
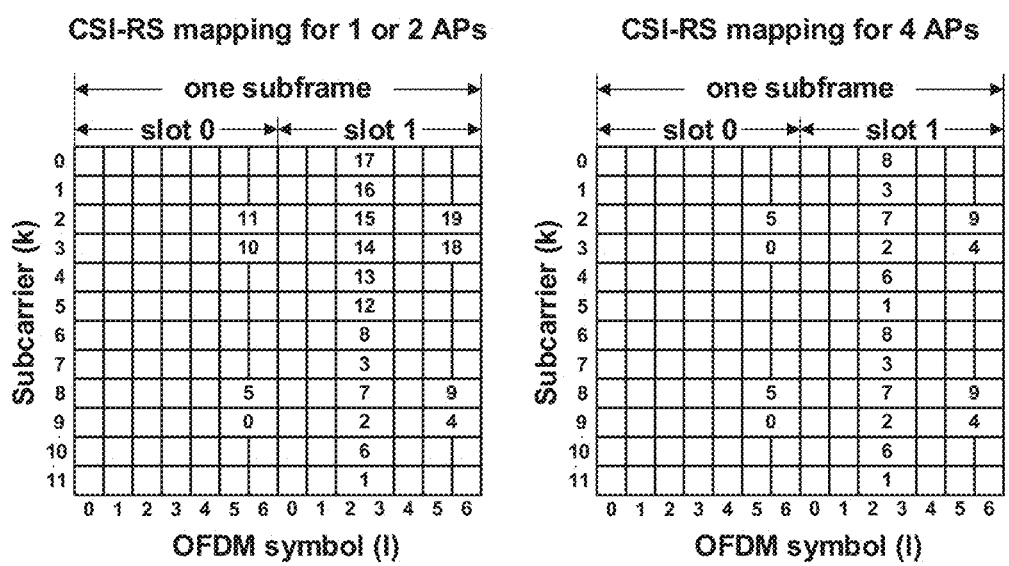
FIG. 4 illustrates configurations of CSI-RS resources for different number of antenna ports. The numbering inside the 2 consecutive Resource Elements, REs, is for the index of configuration.

FIG. 4 shows two examples of mappings from different CSI-RS resource configurations to REs in an RB pair. The left-hand part of FIG. 4 is the mapping for 1 or 2 APs, in which case 20 CSI-RS resource configurations are possible. The 2 CSI-RS, e.g. 2-port CSI-RS, of the 2 APs of a serving cell can be transmitted by for instance CSI-RS resource configuration 0 by using CDM as described above, while CSI-RS of APs of other neighboring cells can be transmitted on CSI-RS resources determined by configuration j with $1 \leq j \leq 19$, in order to avoid CSI-RS collisions with the CSI-RS in the serving cell. The right-hand part of FIG. 4 is the mapping for 4 APs, where 10 configurations are possible. The 4 CSI-RS of the 4 APs of a serving cell can be transmitted on CSI-RS resources determined by e.g. configuration 0 by CDM, while CSI-RS of APs of other neighboring cells can be transmitted on CSI-RS resources determined by configuration j with $1 \leq j \leq 9$, in order to avoid CSI-RS collisions with the CSI-RS in the serving cell.

The OFDM symbols used by the 2 consecutive REs for one CSI-RS are QPSK symbols, which are derived from a specified pseudo-random sequence. To randomize the interference, the initial state of the pseudo-random sequence generator may be determined by the detected cell ID or a virtual cell ID configured to the UE by radio resource control (RRC) signaling from the eNB. A CSI-RS with non-zero-power OFDM symbols is called non-zero-power CSI-RS (NZP CSI-RS).

On the other hand, zero-power (ZP) CSI-RS can also be RRC configured to the UE for the purpose of interference measurement (IM) or for the purpose of improving the CSI estimation in other cells; however, a CSI-RS mapping with 4 APs will likely be used by the ZP CSI-RS.

For example, in FIG. 4, if CSI-RS resource configuration 0 with NZP CSI-RS is used by cell A to estimate the CSI of the 2 APs in cell A, CSI-RS resource configuration 0, with ZP CSI-RS (total 4 REs), can be used by the neighboring cell B to minimize the DL interference to cell A over the 2 REs in CSI-RS resource configuration 0, such that the CSI estimation of the 2 APs in cell A can be improved.

In LTE, for transmission mode 10 (TM10), up to four CSI processes can be configured for a UE by RRC signaling. These four CSI processes may be used to acquire CSI for APs in up to 4 different cells (or transmission points (TPs) within the same cell) in a coordinated multi-point (CoMP) framework. They can also be assigned to multiple different beams transmitted from the same eNB using an array antenna that is capable of beamforming in azimuth, elevation, or both (2D beamforming). See [1], [2], and [3] for complete LTE specifications on how CSI process and CSI-RS configurations are setup.

In order for UE to derive the correct CSI, each CSI process in TM10 is associated with a signal hypothesis and an interference hypothesis. The signal hypothesis describes which NZP CSI-RS reflects the desired signal. The interference, on the other hand, is measured in a configured CSI-IM resource, which is similar to a CSI-RS with 4 RE per PRB pair, in particular similar to a zero-power CSI-RS with 4 RE per resource block pair, which the UE shall use for interference measurements. To better support the interference measurement (IM) in CoMP, CSI-IM is standardized and is based on the ZP CSI-RS. Therefore, each of the up to four CSI processes consists of one NZP CSI-RS and one CSI-IM.

For transmission mode 9 UE, only a single CSI process can be configured, and no CSI-IM is defined. The interference measurement is thus unspecified in TM9. There is however still a possibility to get CSI feedback from two different subframe (SF) sets: SF set 1 and SF set 2. For instance, based on e.g. Reduced Power Subframe (RPSF) information signaled over e.g. X2 from another eNB, a pico eNB may configure a UE to feedback CSI for both protected subframes (e.g. RPSF subframes, in which the macro cell has reduced activity) and CSI for unprotected subframes in two different CSI reports. This enables e.g. a pico eNB to perform link adaptation in the two types of subframes differently, depending on whether it is a protected subframe or not. It is also possible for a UE configured in TM10 to use both subframe sets and multiple CSI processes.

In LTE, the format of the CSI reports may contain CQI (Channel-Quality Information), Rank Indicator (RI), and Precoding Matrix Indicator. See [4]. The reports can be wideband or applicable to subbands. They can be configured by a radio resource control (RRC) message to be sent periodically or in an aperiodic manner, wherein the aperiodic CSI report may be triggered by a control message from the eNB to a UE. The accuracy and reliability of the CSI reports are important for the eNB in order to make the best possible scheduling decisions for the upcoming DL transmissions.

The LTE standard does not specify how the UE should obtain and average the CSI-RS and CSI-IM measurements from multiple time instants, e.g. subframes. For example, the UE may measure over a time frame unknown to the eNB and combine several measurements in a UE-proprietary way to create the CSI-values that are reported, either periodically or triggered.

In the context of LTE, there are CSI-RS resources (certain RE as defined above in relation to FIG. 1 and FIG. 4) in on which CSI-RS may be transmitted. In addition, there are also "CSI-IM resources", where IM stands for "Interference Measurement". The latter are defined from the same set of possible physical locations in the time/frequency grid as the CSI-RS resources, but the CSI-RS is transmitted with zero power in the serving cell. In other words, "silent" CSI-RS are transmitted on the CSI-IM resources. When an eNB transmits on the shared data channel (PDSCH), it should avoid mapping data to the resource elements configured for CSI-IM. These are intended to give a UE the possibility to measure the power of any interference from another transmitter than its serving node.

Each UE can be configured with one, three or four different CSI processes. Each CSI process is associated with one CSI-RS resource and one CSI-IM resource where these CSI-RS resources has been configured to the UE by RRC signaling and are thus periodically transmitted/occurring with a periodicity of T and with a given subframe offset, relative to the frame start as described above.

If only one CSI process is used, then it is common to let the CSI-IM reflect the interference from all other eNB, i.e. the serving cell uses a ZP CSI-RS that overlaps with the CSI-IM, but in other adjacent eNB, there is no ZP CSI-RS on these resources. In this way, the UE will measure the interference from adjacent cells when measuring on the CSI-IM resource.

If additional CSI processes are configured to the UE, then there is a possibility for the network to also configure a ZP CSI-RS in the adjacent eNB that overlaps with a CSI-IM resource for this CSI process for the UE in the serving eNB. In this way the UE may feedback accurate CSI also for the case when the adjacent cell is not transmitting. Hence coordinated scheduling between eNBs is enabled with the use of multiple CSI processes and one CSI process feeds back CSI for full interference case and the other CSI process feeds back CSI for the case when a (strong interfering) adjacent cell is muted. As mentioned above, up to four CSI processes can be configured to the UE, thereby enabling feedback of four different transmission hypotheses.

Physical Downlink Control Channel (PDCCH) and Enhanced PDCCH (EPDCCH) The PDCCH/EPDCCH is used to carry downlink control information (DCI) such as scheduling decisions and power-control commands. More specifically, the DCI may include:

Downlink scheduling assignments, including PDSCH resource indication, transport format, hybrid-ARQ information, and control information related to spatial multiplexing (if applicable). A downlink scheduling assignment may also include a command for power control of the PUCCH used for transmission of hybrid-ARQ acknowledgements in response to downlink scheduling assignments.

Uplink scheduling grants, including PUSCH resource indication, transport format, and hybrid-ARQ-related information. An uplink scheduling grant may also include a command for power control of the PUSCH.

Power-control commands for a set of terminals as a complement to the commands included in the scheduling assignments/grants.

One PDCCH/EPDCCH may carry one DCI message which may contain information according to the description above. Since multiple terminals can be scheduled simultaneously, on both downlink and uplink, there is a possibility to transmit multiple scheduling messages within each subframe. Each scheduling message is transmitted on separate PDCCH/EPDCCH resources, and consequently there may typically be multiple simultaneous PDCCH/EPDCCH transmissions within each cell. Furthermore, to support different radio-channel conditions, link adaptation can be used to adapt a code rate of the PDCCH/EPDCCH to match the radio-channel conditions. When adapting the code rate, the resource usage for the PDCCH/EPDCCH is also affected.

UL Scheduling DCI

DCI format 0 and DCI format 4 contain CSI request fields of 1 or 2 bits [4]. The 2 bit field applies to UEs that are configured with more than one DL cell, and/or UEs that are configured by higher layers with more than one CSI process, and/or UEs that are configured with two CSI measurement sets. Otherwise the 1-bit field applies in which case the bit indicates whether an aperiodic CSI report is requested or not. In the 2-bit cases, the aperiodic CSI trigger bits can have different interpretation, as is described in Section 7.2.1 of [1].

For example, the table below shows the interpretation in case the CSI request field size is 2 bits and the UE is configured in transmission mode 10 for at least one serving cell and the UE is not configured with csi-SubframePattern-Config-r12 for any serving cell. For this example scenario, an aperiodic CSI report can either be triggered for different CSI processes across multiple cells (CSI request field value='10' or '11'), or for a set of CSI processes for the serving cell (CSI request field value='01') according to configuration by higher layers (e.g. RRC signaling).

TABLE 7.2.1-1B

CSI Request field for PDCCH/EPDCCH with uplink DCI format in UE specific search space

| Value of CSI request field | Description |
|---|---|
| '00' | No aperiodic CSI report is triggered |
| '01' | Aperiodic CSI report is triggered for a set of CSI process(es) configured by higher layers for serving cell c |
| '10' | Aperiodic CSI report is triggered for a $1^{st}$ set of CSI process(es) configured by higher layers |
| '11' | Aperiodic CSI report is triggered for a $2^{nd}$ set of CSI process(es) configured by higher layers |

Rel-13 CSI Measurement Restriction

The agreed 3GPP definition of MR is as follows: for a given CSI process, if MR on channel measurement is ON, then the channel used for CSI calculation can be estimated from X NZP CSI-RS subframe(s) up until and including the CSI reference resource. X may be an integer value.

Channel measurement is derived from NZP CSI-RS

For a given CSI process with CSI-IM(s), if MR on interference measurement is ON, then the interference used for CSI computation can be estimated from Y CSI-IM subframe(s) up until and including CSI reference resource. Y may be an integer value.

Interference measurement is derived from CSI-IM

It has been agreed the LTE Rel-13 should contain the following measurement restriction functionality.

Measurement restriction (MR) to a single subframe is independently configurable for each subframe set, when legacy measurement restrictions with two subframe sets are also configured in a CSI process One RRC parameter for restricting NZP CSI-RS channel measurements to a single subframe (i.e. X=1), and One RRC parameter for restricting CSI-IM interference measurement to a single subframe (i.e. Y=1).

This holds for Class A CSI feedback (non-precoded CSI-RS) and for Class B CSI feedback (beamformed CSI-RS) with a single (K=1) beamformed NZP CSI-RS resource. For Class B with K>1, whether and how MR is supported and can be RRC configured is still being discussed.

The MR may be configured per CSI process and per cell. In total, a UE may consequently be independently configured with MR for at least:

Multiple cells (currently between 5 and 32)
Multiple CSI processes per cell (up to 4)
Two subframe sets per CSI process
For each subframe set, for NZP- and ZP CSI-RS Additionally, one can anticipate a possibility to configure CSI feedback with independent MR for each of the CSI-RS resources in a CSI process. Currently up to 8 CSI-RS resources may be supported in a CSI-process, each such resource may support up to 8 CSI-RS antenna ports (AP). Therefore, the total number of MR configurations for a UE may be quite high as described in relation to eq. 1 above. The number of bits required to represent all possible configurations, is expected to be more than can be fit into a DCI message and/or lower layer signaling. Consequently, higher layer signaling is expected to carry the major part of the configuration information related to measurement restrictions.

A DCI message, in particular a downlink control information message carried by the PDCCH or ePDCCH, is in this disclosure, considered to be "lower layer signaling" as opposed to "higher layer signaling" which in this disclosure may comprise e.g. RRC signaling.

The main difference between lower layer signaling and higher layer signaling is reliability, ambiguity and delay. E.g. the lower layer signaling may not support retransmission and may therefore be less reliable than higher layer signaling which may be subject to e.g. HARQ- and/or ARQ-retransmissions at MAC- and RLC-layer respectively. The increased reliability for higher layer signaling comes with an increased delay in comparison with lower layer signaling. The increased delay may e.g. result in that a configuration and/or re-configuration of a measurement restriction for a wireless device takes longer time with higher layer signaling compared with lower layer signaling. In other words, configuring or re-configuring a wireless device with lower layer signaling is faster than configuring or re-configuring a wireless device with higher layer signaling. The ambiguity relates to that the radio network node will not know exactly when the UE has adopted the configuration or re-configuration indicated in the higher layer signaling while a lower layer signaled message is instantaneously adopted. The lower layer signaling may typically carry<100 bits of payload information while such limitation does not really exist for higher layer signaling.

Without dynamic signaling of MR configuration and/or reconfiguration, the system has low possibility to adapt to quick changes in the radio environment which may require an adaptation of the radio link over which communication occurs. For instance, if the path loss temporarily increases between the base station, e.g. an eNB and the UE, an RRC reconfiguration of the MR is needed to disable the MR in order to get more reliable CSI reports. This introduces a delay and additional higher layer signaling, which consumes signaling overhead. Also, there is an ambiguity about when the new MR configuration is applied at the UE due to the use of higher layer signaling, in particular for RRC signaling.

It shall be noted that an MR configuration for measuring and/or reporting CSI may inform the wireless device whether MR is enabled for NZP CSI-RS and CSI-IM/ZP CSI-RS respectively. When configured with MR the wireless device may not be allowed to perform channel interpolation of measurement estimates on NZP CSI-RS resources and/or CSI-IM/ZP CSI-RS resources, across subframes. This limitation may lead to inaccurate and/or unreliable measurements in case of e.g. rapidly changing channel conditions.

The problems described above are addressed by the exemplary embodiments herein providing methods and apparatuses in terms of a radio network node 80, for operating a wireless device in a wireless network, wherein the wireless device is configured, by higher layer signaling, with a first measurement restriction (MR) configuration for measuring and/or reporting Channel State Information (CSI) and in terms of a wireless device, 90, for reporting Channel State Information (CSI) the wireless device is configured, by higher layer signaling, to measure and/or report CSI according to a first measurement restriction (MR) configuration. It shall be mentioned that a measurement restriction (MR) configuration for measuring and/or reporting Channel State Information (CSI) may define how a wireless device shall perform measurements, by e.g. interpolating and/or estimating and/or calculating and/or measuring and additionally and/or optionally also define how and/or when a wireless device shall report its measurement.

The solution is defined by the appended claims.

In the following and according to embodiments herein, there is provided a method performed by/in a radio network node 80 of a wireless network 100, for operating a wireless device in a wireless network, wherein the wireless device is configured, by higher layer signaling, with a first measurement restriction (MR) configuration for measuring and/or reporting Channel State Information. In other words, the radio network node 80 may first configure the wireless device 90 using higher layer signaling, e.g. using RRC signaling. The first MR configuration for measuring and/or reporting CSI is signaled using higher layer signaling, like RRC, and may be performed per cell, per CSI process, per subframe set (if used) and per CSI-RS resource in the CSI process.

Figure 8:
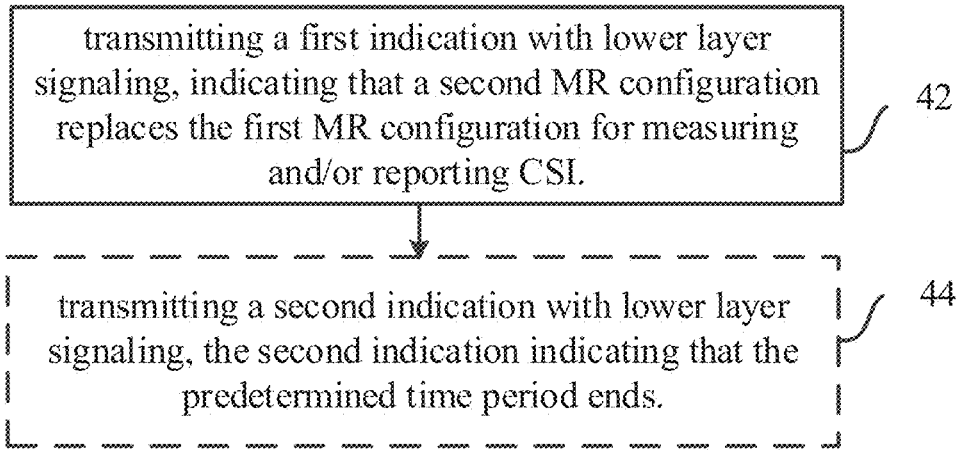
FIG. 8 illustrates a method performed in a radio network node 80 according to embodiments herein.

The method is shown in FIG. 8 and comprises: transmitting 42, a first indication with lower layer signaling, indicating that a second MR configuration replaces the first MR configuration for measuring and/or reporting CSI.

The method is implemented and performed by/in the radio network node 80 as described above. The actions performed by the radio network node 80 will now be described in conjunction with FIG. 8 and include:

In action 42, the radio network node 80 is configured and/or adapted to transmit a first indication with lower layer signaling, e.g. with a DCI message as described above. The first indication indicates that a second MR configuration for measuring and/or reporting CSI replaces the first MR configuration for measuring and/or reporting CSI. E.g., the first MR configuration for measuring and/or reporting CSI has been signaled to the wireless device by higher layer signaling like e.g. RRC signaling as described above. An indication in the lower layer signaling indicates to the wireless device that a second MR configuration for measuring and/or reporting CSI replaces the first MR configuration for measuring a reporting CSI. The second MR configuration for measuring and/or reporting CSI, may relieve the measurement restrictions for the wireless device 90 in order for the wireless device to have more CSI-RS resources—both NZP CSI-RS resources and ZP CSI-RS resources (also known as CSI-IM resources)—to measure on, e.g. the wireless device may use channel interpolation and/or measurement averaging of estimates across CSI-RS resources (e.g. NZP CSI-RS resources and/or CSI-IM/ZP CSI-RS resources) and/or across subframes.

A trigger for the radio network node 80 to transmit the first indication may be that it has detected that the channel conditions has changed, e.g. radio quality and/or received signal strength on the uplink transmissions from the wireless device 90 has decreased. E.g. the radio network 80 node determines that the block error rate (BLER) for uplink transmissions from the wireless device 90 is higher than desirable, e.g. higher than a configurable or predetermined value. Another trigger for the radio network node to transmit an indication may be that the pathloss between the wireless device and the radio network node has changed, e.g. the pathloss has changed more than a configurable or predetermined value between measurements. This may be an indication that the CSI reports from the wireless device may not be accurate and/or reliable to use for link adaptation. In order to increase the reliability, the radio network node may therefore transmit an indication to relieve the measurement restrictions.

The first indication may be implemented by one additional bit in e.g. an uplink scheduling DCI message to indicate whether a second MR configuration for measuring and/or reporting CSI replaces the first MR configuration for measuring and/or reporting CSI.

As an alternative, the first indication may be implemented by modifying the existing CSI request table (from [1], see Table 7.2.1-1B below) in the uplink scheduling DCI format so that one or more states indicates that a second MR configuration for measuring and/or reporting CSI replaces the first MR configuration for measuring and/or reporting CSI. An example is given as follows, the 2-bit state "01" may trigger a CSI report with no measurement restrictions and/or that a second MR configuration for measuring and/or reporting CSI replaces the first MR configuration for measuring and/or reporting CSI for any triggered CSI process, even if a first MR configuration for measuring and/or reporting CSI is configured via higher layer signaling, e.g. with RRC, for a CSI process among the triggered CSI processes. In other words, one of the 2-bit states may indicate that the first MR configuration for measuring and/or reporting CSI, may not be applicable but a second MR configuration for measuring and/or reporting CSI may replace the first configuration. If "10" or "11" bit states are signaled, then the wireless device 90 shall apply a first MR configuration for measuring and/or reporting CSI is configured via higher layer signaling.

TABLE 7.2.1-1B

CSI Request field for PDCCH/EPDCCH with uplink DCI format in UE specific search space

| Value of CSI request field | Description |
|---|---|
| '00' | No aperiodic CSI report is triggered |
| '01' | Aperiodic CSI report is triggered for a set of CSI process(es) configured by higher layers for serving cell, MR is OFF for channel and interference measurements |

TABLE 7.2.1-1B-continued

CSI Request field for PDCCH/EPDCCH with uplink DCI format in UE specific search space

| Value of CSI request field | Description |
|---|---|
| | for the triggered report, irrespectively of higher layer MR configuration |
| '10' | Aperiodic CSI report is triggered for a $1^{st}$ set of CSI process(es) configured by higher layers |
| '11' | Aperiodic CSI report is triggered for a $2^{nd}$ set of CSI process(es) configured by higher layers |

It shall be mentioned that the first- and second MR configurations for measuring and reporting CSI may be applicable for both periodic- and aperiodic CSI reports.

An MR configuration for measuring and/or reporting CSI, may refer to a configuration for only measuring CSI.

According to an embodiment, the second MR configuration for measuring and/or reporting CSI replaces the first MR configuration for a predetermined time period. As an example, the first indication for replacing is comprised in a DCI message for triggering an aperiodic CSI report and the. The replacement of the first MR configuration for measuring and/or reporting CSI may be performed for e.g. only for the requested aperiodic CSI report and/or for a predefined number of periodic CSI reports.

According to another embodiment, wherein the predetermined time period ends after a configurable time. E.g. the predefined number of periodic CSI reports above may be configurable.

In another exemplary embodiment, the method may further comprise transmitting (44) a second indication with lower layer signaling, the second indication indicating that the predetermined time period ends. E.g. a lower layer signaling message, in particular a DCI message may comprise a second indication, which indicates that the second MR configuration for measuring and/or reporting CSI does not replace the first MR configuration for measuring and/or reporting CSI, anymore.

In yet another exemplary embodiment, the second MR configuration for measuring and/or reporting CSI is predetermined. E.g. the radio network node 80 and the wireless device 90 may have agreed upon a predetermined set of configurations or delta configurations, compared to an MR configuration signaled by higher layer, e.g RRC. The predetermined set of configurations and/or delta configurations may configure the wireless device 90 with less measurement restrictions, e.g. a predetermined configuration may correspond to half of all measurement restrictions or some of the measurement restrictions. In other words the measurement opportunities may e.g. be doubled or tripled according to a predefined MR configuration.

In another embodiment, the second MR configuration for measuring and/or reporting CSI is selected from a set of predetermined MR configurations. E.g. the predetermined set may be examples from the previous embodiment with MR configurations and/or delta MR configurations may represent e.g. doubled-, tripled- and quadrupled amount of measurement opportunities.

In another embodiment, the second MR configuration for measuring and/or reporting CSI comprises no measurement restrictions. In this embodiment, the first indication may indicate that no measurement restrictions should be applied for the wireless device when measuring and reporting CSI.

In another embodiment, the method further comprises receiving, from the wireless device 90, a CSI report based on the second MR configuration for measuring and/or reporting CSI.

According to the above, the main steps performed by a radio network node, 80, for operating a wireless device 90 in a wireless network 100, wherein the wireless device 90 is configured, by higher layer signaling, with a first measurement restriction (MR) configuration for measuring and/or reporting Channel State Information (CSI) may be summarized as follows and are shown in FIG. 8:

transmitting 42 a first indication with lower layer signaling, indicating that a second MR configuration for measuring and/or reporting CSI replaces the first MR configuration for measuring and/or reporting CSI.

As disclosed above there are some advantages achieved by carrying out the method e.g.:

enabling efficient dynamic configuration of measurement restrictions for measuring and reporting CSI
  enabling an improved link adaptation for wireless devices
  optimizing a trade-off between measurement restrictions and link adaptation for individual wireless devices
  reducing the signaling overhead of dynamic configuration of MR for measuring and reporting CSI.
dynamic configuration of MR for measuring and reporting CSI has the benefit of disabling the MR, to allow the UE to use measurement averaging across several CSI-RS resources, temporarily.

According to embodiments herein, there is further provided a radio network node 80 for operating a wireless device in a wireless network (100), the radio network node (80) comprising a processing circuitry and a memory, said memory containing instructions executable by said processing circuitry, whereby said radio network node (80) is adapted and/or configured and/or operative to transmit a first indication with lower layer signaling, indicating that a second MR configuration for measuring and/or reporting CSI replaces the first MR configuration for measuring and/or reporting CSI.

Details regarding features of the corresponding method embodiment have already been provided above so it is considered unnecessary to repeat such details. This goes for all embodiments related to the radio network node 80 that will be disclosed below.

In an exemplary embodiment, the radio network node 80 is disclosed, wherein the second MR configuration for measuring and/or reporting CSI replaces the first MR configuration for measuring and/or reporting CSI for a predetermined time period.

In another embodiment, the radio network node 80 is disclosed, wherein the predetermined time period ends after a configurable time.

In one embodiment, the radio network node 80 is disclosed, wherein the radio network node (80) is further adapted and/or configured to transmit a second indication with lower layer signaling, the second indication indicating that the predetermined time period ends.

In yet another embodiment, the radio network node 80 is disclosed, wherein the second MR configuration for measuring and/or reporting CSI is predetermined.

In another embodiment, the radio network node 80 is disclosed, wherein the second MR configuration for measuring and/or reporting CSI is selected from a set of predetermined MR configurations.

In one embodiment, the radio network node 80 is disclosed, wherein the second MR configuration for measuring and/or reporting CSI comprises no measurement restrictions. In one embodiment, the radio network node 80 is disclosed, wherein the radio network node (80) is further adapted and/or configured to receive, from the wireless device 90, a CSI report, based on the second MR configuration for measuring and/or reporting CSI.

According to embodiments herein, there is further provided, as disclosed above, a radio network node 80, comprising a processor and a memory, wherein the memory comprises instructions executable by the processor whereby the radio network node 80 is operative to and/or adapted to and/or configured to perform the main steps for operating a wireless device 90 in a wireless network 100, may be summarized as follows and is shown in FIG. 8:

transmit a first indication with lower layer signaling, indicating that a second MR configuration for measuring and/or reporting CSI replaces the first MR configuration for measuring and/or reporting CSI.

As disclosed above the same advantages as previously disclosed in relation to the method performed by/in the radio network node 80 are hereby also achieved.

Figure 9:
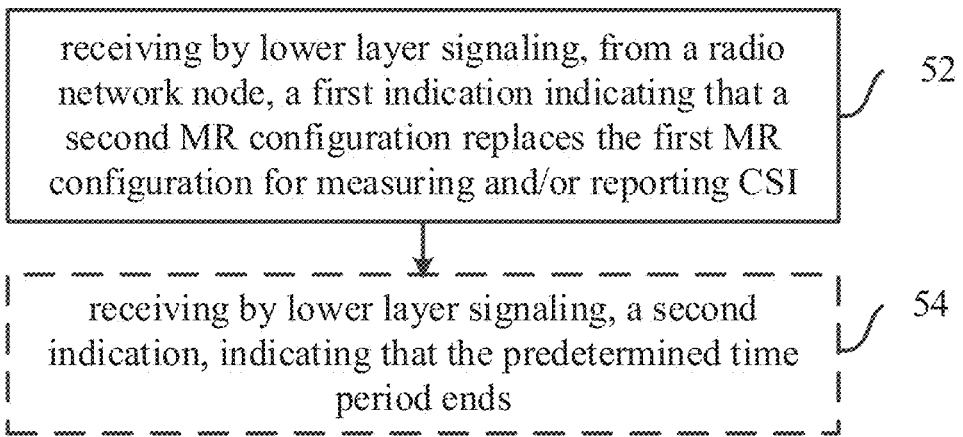
FIG. 9 illustrates a method performed in a wireless device 90 according to embodiments herein.

In the following and according to embodiments herein, there is provided a method for reporting Channel State Information (CSI) by/in a wireless device 90, the wireless device 90 is configured, by higher layer signaling, to measure and/or report CSI according to a first measurement restriction (MR) configuration. The method is illustrated in FIG. 9 and comprises: receiving 52 by lower layer signaling, from a radio network node 80, a first indication indicating that a second MR configuration for measuring and/or reporting CSI replaces the first MR configuration for measuring and/or reporting CSI.

The method is implemented and performed by/in the wireless device 90, as described above. The actions performed by the wireless device 90 will now be described in conjunction with FIG. 9 and include:

In action 52, the wireless device 90 is configured and/or adapted to receive, from a radio network node 80, by lower layer signaling, e.g. in a DCI message as described above, a first indication indicating that a second MR configuration for measuring and/or reporting CSI replaces the first MR configuration for measuring and/or reporting CSI. The second MR configuration for measuring and/or reporting CSI, may relieve the measurement restrictions for the wireless device 90 in order for the wireless device to have more CSI-RS resources—both NZP CSI-RS resources and ZP CSI-RS resources (a.k.a CSI-IM resources)—to measure on.

In one alternative embodiment, the second MR configuration for measuring and/or reporting CSI comprises no measurement restrictions and may be considered as an override of MR configurations for measuring and reporting CSI. This embodiment will be described in relation to FIG. 5.

Figure 5:
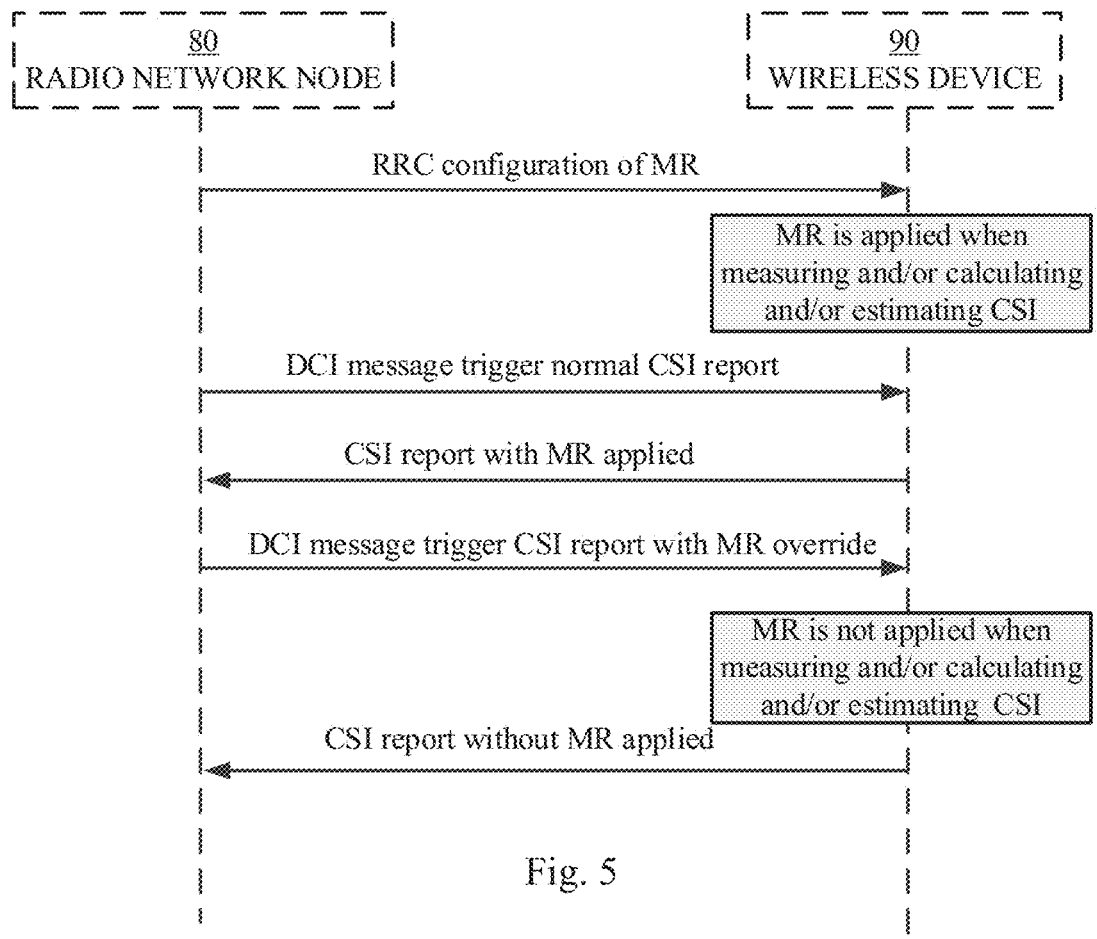
FIG. 5 illustrates a sequence diagram for one embodiment of the invention

In the sequence diagram in FIG. 5, describing an alternative embodiment, the radio network node 80, first configures the wireless device 90, with higher layer signaling, e.g. RRC, with a first MR configuration for measuring and/or reporting CSI. An MR configuration for measuring and/or reporting CSI may indicate whether there are restrictions for measuring on NZP CSI-RS- and CSI-IM/ZP CSI-RS resources respectively. The MR configuration for measuring and/or reporting CSI may impose restrictions to perform channel interpolation of channel measurements and/or channel estimates obtained when measuring on CSI-RS resources and/or CSI-IM resources across subframes, e.g. in a sequence of NZP CSI-RS and/or CSI-IM resources. The RRC configuration may be performed per cell, per CSI process, per subframe set (if used) and per CSI resource in the CSI process (if used and supported in Rel-13) as described above.

As an example, a wireless device may receive a trigger for aperiodic CSI reporting in a DCI message as described above. If the DCI message does not comprise a first indication, indicating that a second MR configuration for measuring and/or reporting CSI replaces the first MR configuration, the wireless device will measure and/or report according to the first MR configuration. In FIG. 5, this corresponds to the "CSI report with MR applied". However, if the DCI message comprises an indication that a second MR configuration for measuring and/or reporting CSI replaces the first MR configuration and that the second MR configuration comprises no measurement restrictions (corresponding to "DCI message trigger CSI report with MR override" in FIG. 5), the wireless device 90 may consider the latter DCI message, signaled by lower layer signaling, as an override of MR configurations for measuring and reporting CSI (corresponding to "MR is not applied when calculating CSI" in FIG. 5) and the wireless device may therefore send a CSI report without considering any MR configuration (corresponding to "CSI report without MR applied" in FIG. 5). The first indication may be conveyed to the wireless device in a lower layer signaling, e.g. comprised in a DCI message to indicate whether a triggered aperiodic CSI report, should not use the first MR configuration for measuring and/or reporting CSI. In other words, to indicate whether the first MR configuration for measuring and/or reporting CSI, should be disabled for the triggered aperiodic CSI report, and thereby overriding the first MR configuration by RRC signaling. If the wireless device 90 does not receive the first indication in e.g. the DCI message, the wireless device 90 should assume that the MR configuration for measuring and/or reporting CSI is enabled and as configured by higher layer signaling, e.g. as configured by RRC. The wireless device 90 should therefore report CSI based on calculations/estimates/measurements, wherein the measurement restrictions, according to RRC configurations, are taken into account.

In one exemplary embodiment, the method is disclosed, wherein the second MR configuration for measuring and/or reporting CSI replaces the first MR configuration for measuring and/or reporting CSI for a predetermined time period. As an example, the first indication for replacing is comprised in a DCI message for triggering an aperiodic CSI report and the replacement of the first MR configuration for measuring and/or reporting CSI may be performed for e.g. only for the requested aperiodic CSI report and/or for a predefined number of periodic and/or aperiodic CSI reports.

According to another embodiment, wherein the predetermined time period ends after a configurable time. E.g. the predefined number of periodic- and/or aperiodic CSI reports above, may be configurable.

In another exemplary embodiment, the method may further comprise receiving 54 by lower layer signaling, a second indication, indicating that the predetermined time period ends. E.g. the wireless device 90 receives a lower layer signaling message, in particular a DCI message may comprise a second indication, which indicates that the second MR configuration for measuring and/or reporting CSI does not replace the first MR configuration for measuring and/or reporting CSI, anymore.

In yet another exemplary embodiment, the second MR configuration for measuring and/or reporting CSI is predetermined. E.g. the radio network node 80 and the wireless device 90 may have agreed upon a predetermined set of configurations and/or delta configurations, compared to an MR configuration signaled by higher layer, e.g RRC. The predetermined set of configurations and/or delta configurations may configure the wireless device 90 with less measurement restrictions, e.g. a predetermined configuration may correspond to half of all measurement restrictions or some of the measurement restrictions. In other words the measurement opportunities may e.g. be doubled or tripled according to a predefined MR configuration.

In another embodiment, the second MR configuration for measuring and/or reporting CSI is selected from a set of predetermined MR configurations. E.g. the predetermined set may be examples from the previous embodiment with MR configurations and/or delta MR configurations may represent e.g. doubled-, tripled- and quadrupled amount of measurement opportunities compared to the first MR configuration for measuring and/or reporting CSI.

In another embodiment, the second MR configuration for measuring and/or reporting CSI comprises no measurement restrictions. In this embodiment, the first indication may indicate that no measurement restrictions should be applied for the wireless device when measuring and reporting CSI as was described above.

In another embodiment, the wireless device 90 indicates, in a CSI report transmitted to the radio network node 80, whether the CSI report was associated with the first- or second MR configuration for measuring and/or reporting CSI.

In another exemplary embodiment, the method may further comprise transmitting, to the radio network node 80, a CSI report, based on the second MR configuration for measuring and/or reporting CSI. In this embodiment the wireless device may measure and/or report CSI with relieved restrictions on measurements which will cater for more reliable and/or accurate CSI reporting which in turn will let the scheduler in the radio network node to perform better link adaptation to increase performance.

It shall be mentioned that the default operation may be that the wireless device 90 measures and reports CSI according to the first MR configuration for measuring and/or reporting CSI.

In another aspect the wireless device 90 receives a higher layer signaling, e.g. RRC, for MR configuration for measuring and/or reporting CSI. Once the wireless device 90 receives a DCI message triggering an aperiodic CSI report with MR override, the wireless device 90 may have two options:

According to a first option, after sending the CSI report corresponding to the lower layer signaling, e.g. a DCI message, comprising a first indication indicating that a second MR configuration for measuring and/or reporting CSI replaces the first MR configuration for measuring and/or reporting CSI, the wireless device 90 returns back to applying the first MR configuration for measuring and/or reporting CSI. E.g. the wireless device 90 does not perform any averaging on CSI-RS and/or CSI-IM measurements for future subframes until it receives another lower layer message, e.g. a DCI message, comprising a first indication indicating that a second MR configuration for measuring and/or reporting CSI replaces the first MR configuration for measuring and/or reporting CSI.

According to a second option, after sending the CSI report corresponding to the lower layer signaling, e.g. a DCI message, comprising a first indication indicating that a second MR configuration for measuring and/or reporting CSI replaces the first MR configuration for measuring and/or reporting CSI, the wireless device 90 continues without applying the first MR configuration for measuring and/or reporting CSI until another lower layer message, e.g. a DCI message, comprises a second indication, indicating that the first MR configuration for measuring and/or reporting CSI should be applied.

If MR is enabled for both periodic- and aperiodic CSI reporting, the MR overriding via DCI message may only be applicable to aperiodic CSI reporting whereas MR may always be applied for periodic CSI reporting.

Figure 6:
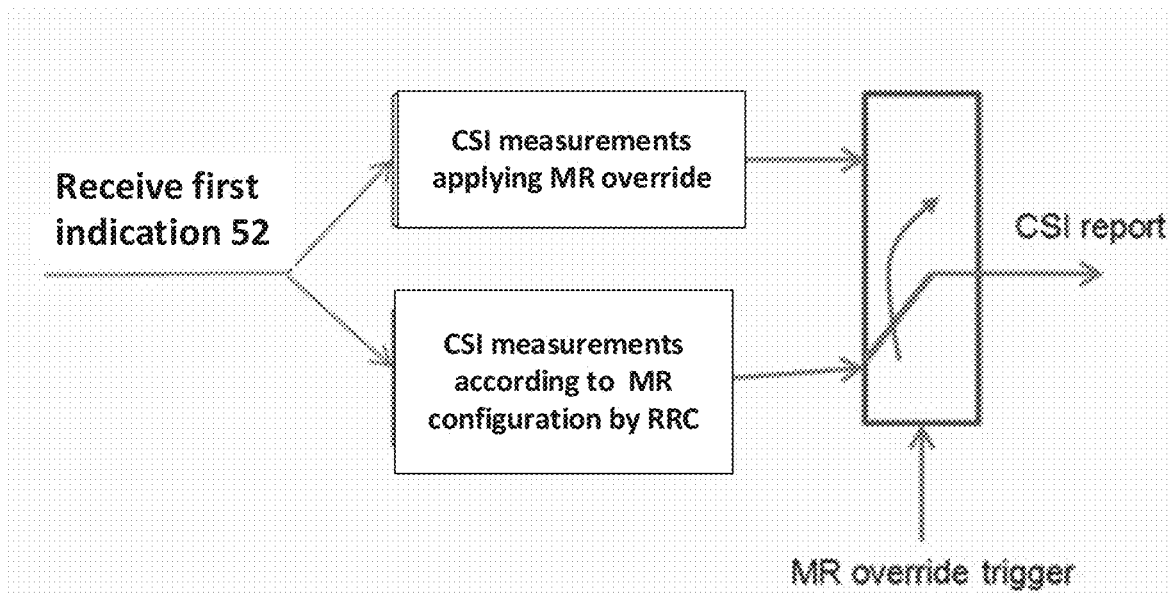
FIG. 6 illustrates an example of how a wireless device may implement parallel CSI measurements

In this case, to support the above MR override, a wireless device 90 can have two measurement circuits running in parallel as is illustrated in FIG. 6, one for implementing CSI measuring and reporting by applying MR override, e.g. MR is OFF, and the other circuit for implementing CSI measurements without applying MR override. So when a first indication indicating that a second MR configuration for measuring and/or reporting CSI replaces the first MR configuration for measuring and/or reporting CSI is received, the circuit for CSI measurement with MR override is used and the wireless device 90 may provide CSI information obtained across multiple CSI-RS resources and/or subframes in any CSI report in case a first indication indicating that a second MR configuration for measuring and/or reporting CSI replaces the first MR configuration for measuring and/or reporting CSI is received.

According to the above, the main steps performed by a wireless device 90, for reporting Channel State Information (CSI) may be summarized as follows and are shown in FIG. 9:

receiving 52 by lower layer signaling, from a radio network node, a first indication indicating that a second MR configuration for measuring and/or reporting CSI replaces the first MR configuration for measuring and/or reporting CSI.

Since the method in the wireless device 90, may perform the complementary steps to the method described above, in relation to the method in the radio network node 80, the same advantages are achieved by carrying out the method in the wireless device 90, as e.g.:

enabling efficient dynamic configuration of measurement restrictions for measuring and reporting CSI
  enabling an improved link adaptation for wireless devices
  optimizing a trade-off between measurement restrictions and link adaptation for individual wireless devices
  reducing the signaling overhead of dynamic configuration of MR for measuring and reporting CSI.
  dynamic configuration of MR for measuring and reporting CSI has the benefit of disabling the MR, to allow the UE to use measurement averaging across several CSI-RS resources, temporarily.

According to embodiments herein, there is further provided a wireless device 90, configured by higher layer signaling with a first measurement restriction (MR) configuration for measuring and/or reporting Channel State Information (CSI) the wireless device 90 comprising a processing circuitry and a memory, said memory containing instructions executable by said processing circuitry, whereby said wireless device 90 is adapted and/or configured and/or operative to: receive by lower layer signaling, from a radio network node (80), a first indication indicating that a second MR configuration for measuring and/or reporting CSI replaces the first MR configuration for measuring and/or reporting CSI.

Details regarding features of the corresponding method embodiment have already been provided above so it is considered unnecessary to repeat such details. This goes for all embodiments related to the wireless device 90 that will be disclosed below.

In one exemplary embodiment, the wireless device 90 is disclosed, wherein the second MR configuration for measuring and/or reporting CSI replaces the first MR configuration for measuring and/or reporting CSI when measuring and reporting CSI for a predetermined time period.

In another exemplary embodiment, the wireless device 90 is disclosed, wherein the predetermined time period ends after a configurable time.

In one exemplary embodiment, the wireless device 90 is disclosed, wherein the wireless device (90) is further adapted and/or configured to receive by lower layer signaling, a second indication, indicating that the predetermined time period ends.

In one aspect, the wireless device 90 is disclosed, wherein the second MR configuration for measuring and/or reporting CSI for measuring and reporting CSI is predetermined.

In yet another exemplary embodiment, the wireless device 90 is disclosed, wherein the second MR configuration for measuring and/or reporting CSI is selected from a set of predetermined MR configurations.

In another exemplary embodiment, the wireless device 90 is disclosed, wherein the second MR configuration for measuring and/or reporting CSI comprises no measurement restrictions.

In one exemplary embodiment, the wireless device 90 is disclosed, wherein the wireless device 90 is further adapted and/or configured to transmit, to the radio network node 80, a CSI report, based on the second MR configuration for measuring and/or reporting CSI.

According to embodiments herein, there is further provided, as disclosed above, a wireless device 90, comprising a processor and a memory, wherein the memory comprises instructions executable by the processor whereby the wireless device 90 is operative to and/or adapted to perform the main steps for reporting Channel State Information, CSI and may be summarized as follows and is shown in FIG. 9:

receive by lower layer signaling, from a radio network node (80), a first indication indicating that a second MR configuration for measuring and/or reporting CSI replaces the first MR configuration for measuring and/or reporting CSI.

As disclosed above the same advantages as previously disclosed in relation to the method performed by/in the wireless device 90 are hereby also achieved.

According to embodiments herein, there is further provided a radio network node 80 adapted to operate a wireless device 90 in a wireless network, the radio network node 80 comprises a transmitter module 82 for transmitting a first indication with lower layer signaling, indicating that a second MR configuration for measuring and/or reporting CSI replaces the first MR configuration for measuring and/or reporting CSI and a receiving module for receiving a CSI report, based on the second MR configuration for measuring and/or reporting CSI.

According to embodiments herein, there is further provided a wireless device 90 adapted to receive by lower layer signaling, from a radio network node 80, a first indication indicating that a second MR configuration for measuring and/or reporting CSI replaces the first MR configuration for measuring and/or reporting CSI, the wireless device 90 comprises a receiver module 92 receiving by lower layer signaling, from a radio network node 80, a first indication indicating that a second MR configuration for measuring and/or reporting CSI replaces the first MR configuration for measuring and/or reporting CSI and a transmitter module 93 for transmitting to the radio network node 80, a CSI report, based on the second MR configuration for measuring and/or reporting CSI.

Figure 10:
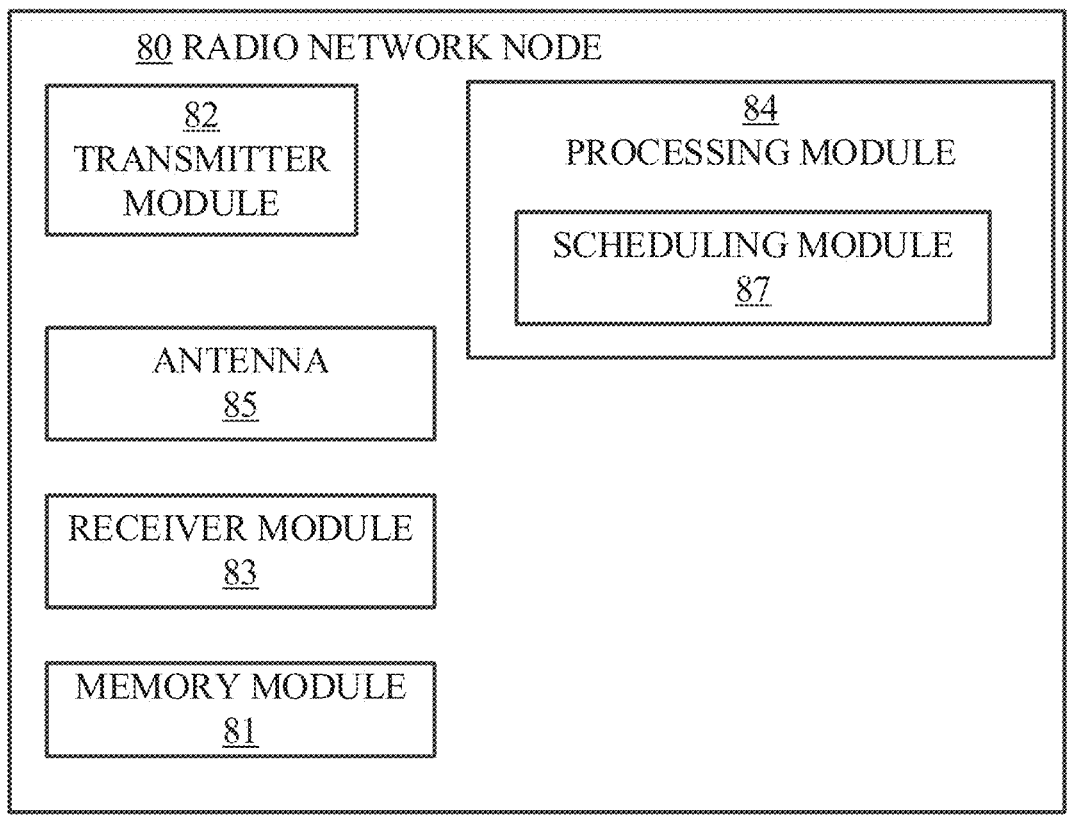
FIG. 10 is a block diagram illustrating a radio network node 80, according to exemplary embodiments herein.

Referring to FIG. 10 there is illustrated a block diagram of exemplary components of a radio network node 80 in accordance with previously disclosed embodiments. The radio network node 80 may comprise a transmitter circuit or transmitter module 82; a receiver circuit or a receiver module 83; a processor 84 or a processing module or processing circuitry; a memory or memory module 81 and optionally an antenna 85.

An antenna 85 may include one or more antennas to transmit and/or receive radio frequency (RF) signals over the air interface. Antenna 85 may, for example, receive RF signals from transmitter circuit 82 and transmit the RF signals over the air interface to one or more wireless devices e.g. UEs and receive RF signals over the air interface from the one or more wireless devices e.g. UEs and provide the RF signals to receiver circuit 83.

A processing module/circuit 84 includes a processor, microprocessor, an application specific integrated circuit (ASIC), field programmable gate array (FPGA), or the like. The processor 84 controls the operation of the radio network node 80 and its components. Memory (circuit or module) 85 includes a random access memory (RAM), a read only memory (ROM), and/or another type of memory to store data and instructions that may be used by processor 84. The radio network node 80 may comprise additional components not shown in FIG. 10.

The memory 81 may comprise instructions executable by the processor 84 whereby the radio network node 80 is operative to perform the previously described method steps. There is also provided a computer program comprising computer readable code means which when run in the radio network node 80, e.g. by means of the processor 84 causes the radio network node 80 to perform the above described method steps which include: to transmit a feedback timing indicator, FTI, wherein the indicator is selected from a set of indicators.

Figure 11:
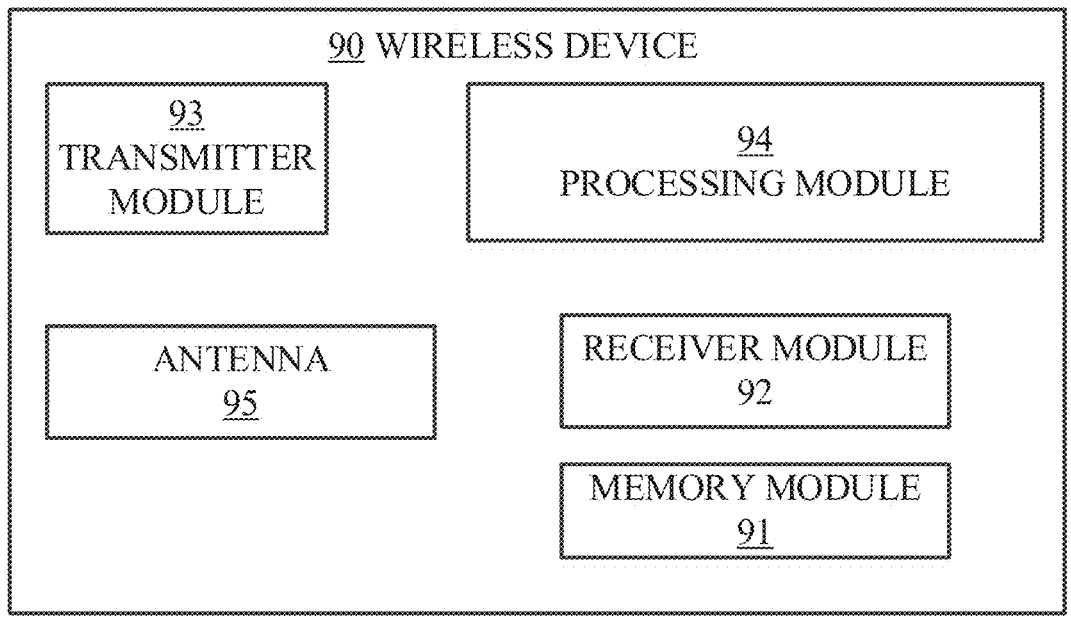
FIG. 11 is a block diagram illustrating a wireless device 90, according to exemplary embodiments herein.

Referring to FIG. 11 there is illustrated a block diagram of exemplary components of a wireless device 90 in accordance with previously disclosed embodiments. The wireless device 90 may comprise a transmitter circuit or transmitter module 93; a receiver circuit or a receiver module 92; a processor 94 or a processing module or processing circuitry; a memory or memory module 91 and may optionally also comprise one antenna 95, The antenna 95 may include one or more antennas to transmit and/or receive radio frequency (RF) signals over the air interface. The antenna 95 may, for example, receive RF signals from the transmitter circuit 93 and transmit the RF signals over the air interface to one or more radio network nodes i.e. radio base stations e.g. eNodeBs or eNBs or APs and receive RF signals over the air interface from the one or more radio base stations e.g. eNodeBs or eNBs or APs and provide the RF signals to receiver circuit 92.

Processing module/circuit 94 includes a processor, microprocessor, an application specific integrated circuit (ASIC), field programmable gate array (FPGA), or the like. Processor 94 controls the operation of the wireless device 90 and its components. Memory (circuit or module) 91 includes a random access memory (RAM), a read only memory (ROM), and/or another type of memory to store data and instructions that may be used by processor 94. The wireless device 90 may comprise additional components not shown in FIG. 11.

The memory 91 may contain instructions executable by the processor 94 whereby the wireless device 90 is operative to perform the previously described method steps. There is also provided a computer program comprising computer readable code means which when run in the wireless device 90 e.g. by means of the processor 94 causes the wireless device 90 to perform the above described method steps, which include: receive a feedback timing indicator, FTI, and to transmit retransmission feedback based on the feedback timing indicator. This may be done by means of the processing module 94, the receiver module 92 and the transmitter module 93.

A wireless network 100 may be any communication system as defined by 3GPP, such as UMTS, LTE, NR, GSM, CDMA2000 or a core network such as EPS or any combination of those.

A CSI report being based on an MR configuration for measuring and/or reporting CSI may mean that a wireless device measures on the CSI-RS and CSI-IM resources according to the MR configuration. An MR configuration for measuring and/or reporting CSI may or may not, allow for averaging of measurements across CSI-RS- and/or CSI-IM resources.

A regular DCI may comprise configuration information to control the code rate and/or modulation and coding scheme (MCS) and/or message size and/or transport block size and/or carrier to use and/or frequency to transmit on, for the receiving device 90, which may be used when transmitting requested retransmission feedback and/or UL data. This may enable an adoption of the transmission format in the UL subframe, to the current channel conditions and may consequently improve the reliability of the UL transmission.

A CSI-RS resource may be a radio resource in a wireless communication system, in particular one or more subframes and/or a resource blocks and/or a resource elements in an LTE system.

When configured with MR the wireless device may not be allowed to perform channel interpolation and/or measurement averaging of estimates across NZP CSI-RS resources and/or CSI-IM/ZP CSI-RS resources and/or across subframes.

To perform and/or use channel interpolation and/or measurement averaging of estimates across CSI-RS resources (e.g. NZP CSI-RS resources and/or CSI-IM/ZP CSI-RS resources) and/or across subframes, may mean that a sequence of results from measuring and/or estimating CSI from different CSI-RS- and CSI-IM resources, may be used to calculate an accurate and reliable CSI value which is reflecting the channel condition and/or channel state. E.g. a weighted average or channel interpolation may be performed to obtain a reliable and accurate value of CSI.

The MR configuration for measuring and/or reporting CSI may impose restrictions to perform channel interpolation of channel measurements and/or channel estimates obtained when measuring on CSI-RS resources and/or CSI-IM resources across subframes, e.g. in a sequence of NZP CSI-RS and/or CSI-IM resources.

A wireless device may apply MR override which may mean that the wireless device measures and reports CSI based on an MR configuration for measuring and/or reporting CSI which is different from an MR configuration for measuring and/or reporting CSI, which has been signalled to the wireless device with higher layer signalling, e.g. RRC signalling and would be applied in case the wireless device did not apply MR override. In particular, a wireless device may apply MR override by applying no measurement restrictions although it has been configured by RRC signalling, with MR configuration for measuring and/or reporting CSI.

The main difference between lower layer signaling, in particular a downlink control information (DCI) message carried by the PDCCH (or ePDCCH) and higher layer signaling, e.g. RRC signaling, lies in the signaling reliability, ambiguity and delay. The lower layer signaling may not support retransmission and may therefore be less reliable (reliability ~$10^{-2}$) but may be much faster than higher layer signaling which may be subject to both HARQ- and ARQ-retransmissions at MAC- and RLC-layer respectively which introduces a delay compared to lower layer signalling. In addition, there is an ambiguity of when the UE has adopted the change indicated in the higher layer signaling while a lower layer signaled message is instantaneously adopted. The lower layer signaling can only carry<100 bits of payload information while such limitation does not really exist for higher layer signaling.

Throughout this disclosure, the word "comprise" or "comprising" has been used in a non-limiting sense, i.e. meaning "consist at least of". Although specific terms may be employed herein, they are used in a generic and descriptive sense only and not for purposes of limitation. In particular, it should be noted that although terminology from 3GPP and IEEE802.11EEE has been used in this disclosure to exemplify the invention, this should not be seen as limiting the scope of the invention to only the aforementioned system. Other communication systems, including LTE or LTE-A (LTE-Advanced) and WiMax may also benefit from exploiting the ideas covered within this disclosure.

What is claimed is:

1. A method, in a radio network node, for operating a wireless device in a wireless network, wherein the wireless device is configured, by higher layer signaling, with a first measurement restriction (MR) configuration for measuring and reporting Channel State Information (CSI), the method comprising:
    transmitting a first indication to the wireless device, with lower layer signaling, the first indication indicating that a second MR configuration for measuring and reporting CSI is to be used for measuring and reporting CSI instead of the first MR configuration, wherein the second MR configuration is selected from a predetermined set of MR configurations agreed upon by the radio network node and the wireless device and wherein each of the MR configurations defines restrictions in time over which the wireless device performs measurements on non-zero power (NZP) CSI reference signal (CSI-RS) resources, wherein the first indication indicates that the second MR configuration for measuring and reporting CSI is to be used for a predetermined time period, instead of the first MR configuration for measuring and reporting CSI, when measuring and reporting CSI.

2. The method of claim 1, wherein the predetermined time period ends after a configurable time.

3. The method of claim 1, wherein the method further comprises:
    transmitting a second indication to the wireless device, with lower layer signaling, the second indication indicating an end of a period for using the second MR configuration for measuring and reporting CSI, instead of the first MR configuration.

4. The method of claim 1, wherein the second MR configuration for measuring and reporting CSI comprises no measurement restrictions.

5. The method of claim 1, wherein the method further comprises:
    receiving, from the wireless device, a CSI report based on the second MR configuration for measuring and reporting CSI.

6. The method of claim 1, wherein the predetermined time period is defined in terms of a number of periodic and/or aperiodic reports.

7. The method of claim 6, wherein the predetermined time period is defined in terms of a number of periodic and/or aperiodic reports greater than one.

8. A method for reporting Channel State Information (CSI) in a wireless device, wherein the wireless device is configured, by higher layer signaling, to measure and report CSI according to a first measurement restriction (MR) configuration, the method comprising:
    receiving from a radio network node, by lower layer signaling, a first indication indicating that a second MR configuration for measuring and reporting CSI is to be used for measuring and reporting CSI instead of the first MR configuration, wherein the second MR configuration is selected from a predetermined set of MR configurations agreed upon by the radio network node and the wireless device and wherein each of the MR configurations defines restrictions in time over which the wireless device performs measurements on non-zero power (NZP) CSI reference signal (CSI-RS) resources, wherein the first indication indicates that the second MR configuration for measuring and reporting CSI is to be used for a predetermined time period, instead of the first MR configuration for measuring and reporting CSI, when measuring and reporting CSI.

9. The method of claim 8, wherein the predetermined time period ends after a configurable time.

10. The method of claim 8, wherein the method further comprises:
    receiving a second indication from the radio network node, via lower layer signaling, the second indication indicating an end of a period for using the second MR configuration for measuring and reporting CSI, instead of the first MR configuration.

11. The method of claim 8, wherein the second MR configuration for measuring and reporting CSI comprises no measurement restrictions.

12. The method of claim 8, wherein the method further comprises:
    transmitting, to the radio network node, a CSI report, based on the second MR configuration for measuring and reporting CSI.

13. The method of claim 8, wherein the predetermined time period is defined in terms of a number of periodic and/or aperiodic reports.

14. The method of claim 13, wherein the predetermined time period is defined in terms of a number of periodic and/or aperiodic reports greater than one.

15. A radio network node for operating in a wireless network, the radio network node comprising a processing circuitry and a memory, said memory containing instructions executable by said processing circuitry, whereby said radio network node is configured to:
    transmit, to a wireless device previously configured by higher layer signaling with a first measurement restriction (MR) configuration for measuring and reporting Channel State Information (CSI), a first indication, using lower layer signaling, the first indication indicating that a second MR configuration for measuring and reporting CSI is to be used for measuring and reporting CSI instead of the first MR configuration, wherein the second MR configuration is selected from a predetermined set of MR configurations agreed upon by the radio network node and the wireless device and wherein each of the MR configurations defines restrictions in time over which the wireless device performs measurements on non-zero power (NZP) CSI reference signal (CSI-RS) resources, wherein the first indication indicates that the second MR configuration for measuring and reporting CSI is to be used for a predetermined time period, instead of the first MR configuration for measuring and reporting CSI, when measuring and reporting CSI.

16. The radio network node of claim 15, wherein the predetermined time period ends after a configurable time.

17. The radio network node of claim 15, wherein the radio network node is further configured to:
transmit a second indication to the wireless device, with lower layer signaling, the second indication indicating an end of a period for using the second MR configuration for measuring and reporting CSI, instead of the first MR configuration.

18. The radio network node of claim 15, wherein the second MR configuration for measuring and reporting CSI comprises no measurement restrictions.

19. The radio network node of claim 15, wherein the radio network node is further configured to:
receive, from the wireless device, a CSI report based on the second MR configuration for measuring and reporting CSI.

20. The radio network node of claim 15, wherein the predetermined time period is defined in terms of a number of periodic and/or aperiodic reports.

21. The radio network node of claim 20, wherein the predetermined time period is defined in terms of a number of periodic and/or aperiodic reports greater than one.

22. A wireless device for reporting Channel State Information (CSI),
the wireless device comprising a processing circuitry and a memory, said memory containing instructions executable by said processing circuitry, whereby said wireless device is configured to:

be configured, by higher layer signaling, with a first measurement restriction (MR) configuration for measuring and reporting Channel State Information (CSI); and receive by lower layer signaling, from a radio network node, a first indication indicating that a second MR configuration for measuring and reporting CSI is to be used for measuring and reporting CSI instead of the first MR configuration, wherein the second MR configuration is selected from a predetermined set of MR configurations agreed upon by the radio network node and the wireless device and wherein each of the MR configurations defines restrictions in time over which the wireless device performs measurements on non-zero power (NZP) CSI reference signal (CSI-RS) resources, wherein the first indication indicates that the second MR configuration for measuring and reporting CSI is to be used for a predetermined time period, instead of the first MR configuration for measuring and reporting CSI, when measuring and reporting CSI.

23. The wireless device of claim 22, wherein the predetermined time period ends after a configurable time.

24. The wireless device of claim 22, wherein the wireless device is further configured to:
receive a second indication from the radio network node, via lower layer signaling, the second indication indicating an end of a period for using the second MR configuration for measuring and reporting CSI, instead of the first MR configuration.

25. The wireless device of claim 22, wherein the second MR configuration for measuring and reporting CSI comprises no measurement restrictions.

26. The wireless device of claim 22, wherein the wireless device is further configured to:
transmit, to the radio network node, a CSI report based on the second MR configuration for measuring and reporting CSI.

27. The wireless device of claim 22, wherein the predetermined time period is defined in terms of a number of periodic and/or aperiodic reports.

28. The wireless device of claim 27, wherein the predetermined time period is defined in terms of a number of periodic and/or aperiodic reports greater than one.

* * * * *

UNITED STATES PATENT AND TRADEMARK OFFICE
CERTIFICATE OF CORRECTION

PATENT NO. : 11,528,115 B2
APPLICATION NO. : 15/969865
DATED : December 13, 2022
INVENTOR(S) : Frenne et al.

It is certified that error appears in the above-identified patent and that said Letters Patent is hereby corrected as shown below:

On the Title Page

On Page 2, in Item (56), under "OTHER PUBLICATIONS", in Column 2, Line 20, delete "WG1#83," and insert -- WG1 Meeting #83, --, therefor.

On Page 2, in Item (56), under "OTHER PUBLICATIONS", in Column 2, Line 23, delete "WG1#82bis," and insert -- WG1 Meeting #82bis, --, therefor.

On Page 2, in Item (56), under "OTHER PUBLICATIONS", in Column 2, Line 26, delete "WG1#82," and insert -- WG1 Meeting #82, --, therefor.

On Page 2, in Item (56), under "OTHER PUBLICATIONS", in Column 2, Line 46, delete "WG1#82" and insert -- WG1 Meeting #82 --, therefor.

In the Specification

In Column 1, Lines 27-28, delete "Evolved Universal Terrestrial Access Network (E-UTRAN)." and insert -- Evolved Universal Terrestrial Radio Access Network (E-UTRAN). --, therefor.

In Column 5, Line 10, delete "gUTRA" and insert -- eUTRA --, therefor.

In Column 6, Line 54, delete "cell specific reference symbols (CRS)," and insert -- cell specific reference symbols, --, therefor.

In Column 23, Line 27, delete "IEEE802.11EEE" and insert -- IEEE 802. IEEE --, therefor.

Signed and Sealed this
Fourth Day of July, 2023

Katherine Kelly Vidal
*Director of the United States Patent and Trademark Office*